United States Patent [19]

Karasaki et al.

[11] Patent Number: 4,901,102
[45] Date of Patent: Feb. 13, 1990

[54] FOCUS DETECTING OPTICAL SYSTEM

[75] Inventors: Toshihiko Karasaki; Kazumi Sugitani, both of Osaka, Japan

[73] Assignee: Minolta Camera Kabushiki Kaisha, Osaka, Japan

[21] Appl. No.: 225,909

[22] Filed: Jul. 29, 1988

[30] Foreign Application Priority Data

Jul. 30, 1987 [JP] Japan .................. 62-192080

[51] Int. Cl.$^4$ .................. G03B 3/00
[52] U.S. Cl. .................. 354/408; 354/402
[58] Field of Search .......... 354/400, 402, 406, 408

[56] References Cited

U.S. PATENT DOCUMENTS 4,792,669 12/1988 Ohnuki et al. .......... 354/406

FOREIGN PATENT DOCUMENTS 0095511 5/1987 Japan .................. 354/402

Primary Examiner—Russell E. Adams
Attorney, Agent, or Firm—Burns, Doane, Swecker & Mathis

[57] ABSTRACT

A focus detecting optical system comprises an objective lens for forming an image of an object, at least one condenser lens disposed behind a predetermined image plane of the objective lens for converging light passed through the objective lens, at least one pair of image re-forming lenses located behind the condenser lens for re-forming a pair of secondary images of the image formed by the objective lens, at least one pair of rows of light receiving elements arrayed in a single line behind and in alignment with the paired image re-forming lenses for detecting the paired secondary images, and a light deflecting member disposed between the image re-forming lenses and the element rows and separated from said image re-forming lenses by an air space for deflecting light fluxes forming the secondary images outwards in a direction of array of the element rows with respect to a center of the paired secondary images. By such a construction, a state of focus adjustment of the objective lens can be detected on the basis of a change of the position of the secondary images detected by the element rows.

15 Claims, 7 Drawing Sheets

——— ELEMENT ROW I
- - - -     〃        〃 II

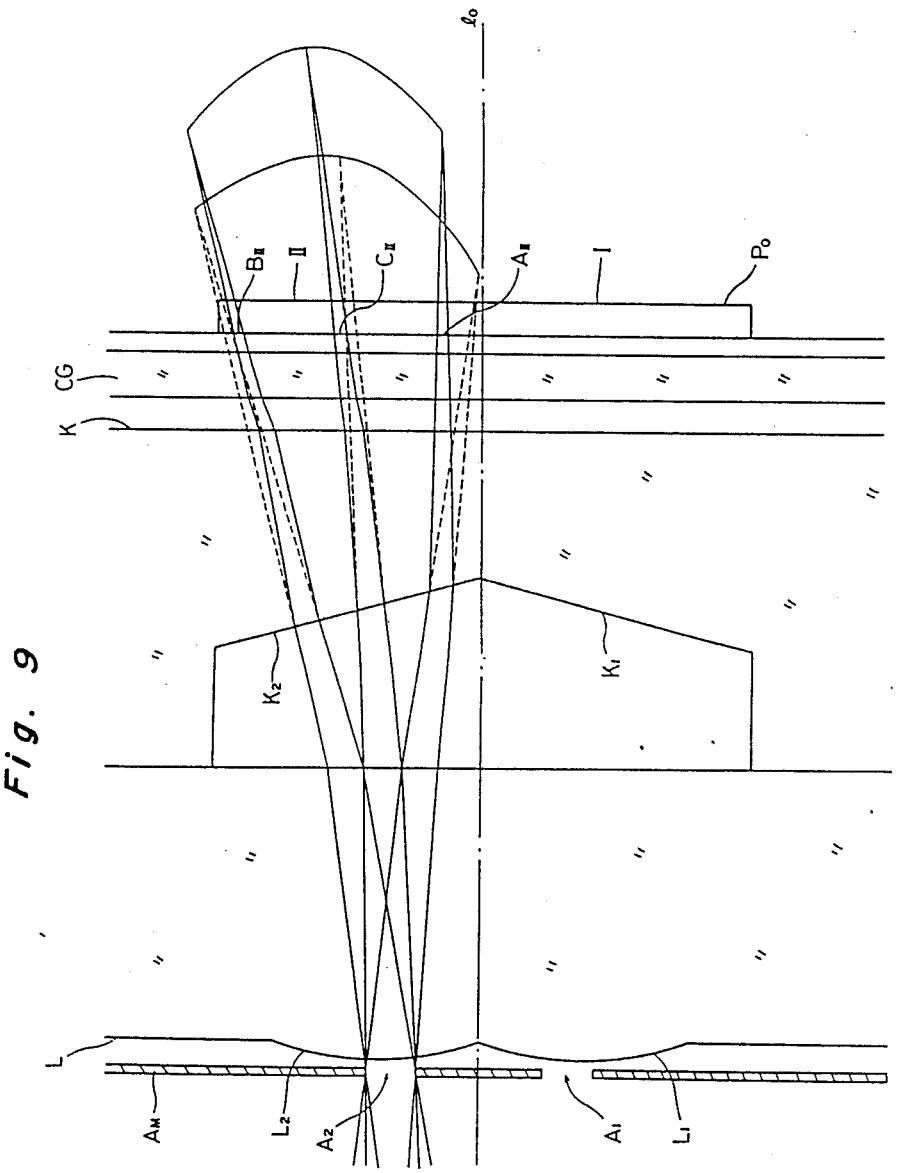

FOCUS DETECTING OPTICAL SYSTEM

BACKGROUND OF THE INVENTION

1. Field of the Invention

The present invention generally relates to a focus detecting optical system for use in a camera, and more particularly, to a focus detecting optical system employed as a focus detecting device in a single lens reflex camera or a video camera provided with automatic focus adjustment.

2. Description of the Prior Art

FIG. 1 depicts a focus detecting optical system employing therein the conventional phase difference detecting method. The focus detecting optical system of FIG. 1 is comprised of a condenser lens Lo and a pair of image re-forming lenses L1 and L2 positioned substantially symmetrically with respect to an optical axis lo (referred to as the main optical axis hereinafter) of an objective lens (not shown). An image formed by the objective lens is formed again as first and second images by the condenser lens Lo and the paired image re-forming lenses L1 and L2. The distance between the first and second images re-formed by the image re-forming lenses L1 and L2 varies in accordance with a state of focus adjustment of the objective lens. Accordingly, if first and second rows I and II of a plurality of light receiving elements of a line sensor Po are arrayed in a single line at a location, or in the vicinity thereof, conjugate to a predetermined image plane FP with respect to the condenser lens Lo and the paired image re-forming lenses L1 and L2, the first and second rows I and II of the light receiving elements can detect a change of the position of the first and second images, thus enabling the detection of the state of focus adjustment of the objective lens.

In FIG. 1, the length S of a focus detection area on the predetermined image plane FP of the objective lens is determined on the basis of the lengths $S_I$ and $S_{II}$ of the first and second element rows I and II of the line sensor Po, when an image magnification of the optical system is constant. Accordingly, for the purpose of lengthening the length S of the focus detection area, the lengths $S_I$ and $S_{II}$ are required to be lengthened.

FIG. 3 depicts an example of a focus detecting optical system in which the length S of the focus detection area is lengthened, as compared with the system of FIG. 1. The lengthened $S_I$ and $S_{II}$ of the element rows I and II involve the necessity of extending the distance between the first and second images to be re-formed. In the optical system of FIG. 3, the distance l between the centers O and O' of the paired image re-forming lenses L1 and L2 is extended. Thus, optical paths for re-forming the first and second images are deflected from those shown by dotted lines to those shown by double dotted chain lines so that the distance between the first and second images may be extended. The distance between a pair of apertures A1 and A2 formed in an aperture mask AM may conceivably be extended as well. In this case, however, since light fluxes for detecting the focus are liable to be vignetted, F.No. of interchangeable lenses enabling the focus detection is restricted. Accordingly, in this embodiment, only the distance between the image re-forming lenses L1 and L2 is extended from that shown by a dotted line to that shown by a solid line, thus extending the distance between the first and second images.

However, if the focus detection area is enlarged only by the off-centered image re-forming lenses L1 and L2, image planes of the first and second images to be re-formed are greatly curved. This fact disadvantageously involves a focus detection error, since point images formed on the first and second element rows I and II can not become symmetric in size with respect to the center of a light receiving portion.

FIGS. 2 and 4 depict the size of the point images on the element rows I and II of FIGS. 1 and 3, respectively. In FIG. 1, the distance l between the image re-forming lenses L1 and L2 is determined so that the light fluxes from the intersection C between the predetermined image plane FP and the main optical axis lo may travel substantially straightforwardly to form respective images on the central points $C_I$ and $C_{II}$ of the first and second element rows I and II. In this case, there is produced little difference in size between the point images, of end points A and B in the focus detection area, re-formed on end points $A_I$, $A_{II}$ and $B_I$, $B_{II}$ of respective element rows I and II, as shown in FIG. 2. In contrast, FIG. 3 shows the case in which the light fluxes from the intersection C are deflected in the vicinity of the image re-forming lenses L1 and L2 and the distance l therebetween is extended so that the light fluxes may be re-formed on the central points $C_I$ and $C_{II}$ of the element rows I and II. In this case, the light flux entering the image re-forming lens L1 from the point A can enter the first element row I without being subjected to any large deflection when passing through the image re-forming lens L1. To the contrary, the light flux entering the image re-forming lens L2 from the point A enters the second element row II while being subjected to relatively large deflection when passing through the image re-forming lens L2. Accordingly, the light flux having passed through the image re-forming lens L2 forms an image a little ahead of another image formed by the light flux having passed through the image re-forming lens L1. In other words, the point image re-formed on the end point $A_{II}$ of the second element row II becomes smaller than that reformed on the end point $A_I$ of the first element row I. Accordingly, as shown in FIG. 4, there is produced considerable difference in size between the point images, of the end points A and B of the focus detection area, reformed on the end points $A_I$, $A_{II}$ and $B_I$, $B_{II}$ of the first and second element rows I and II. This causes the focus detection error.

FIG. 5 depicts an object having three white stripes X, Y and Z on the black background. In a focus detection area $F_A$, the white stripes X and Z are placed close to the end points A and B, respectively, whereas the white stripe Y is placed in the vicinity of the central point C. FIG. 6 depicts outputs of the first and second element rows I and II in this case. As clearly shown in FIG. 6, the first and second element rows I and II view the white stripe Y in substantially the same width in the vicinity of the central point C and the white stripes X and Z in different widths in the vicinity of the end points A and B as if the two element rows I and II view different white stripes having different widths. Thus, when the size of the same point image is viewed remarkably differently by the two element rows I and II, the degree of coincidence between the first and second images is lowered, rendering the focus detection accuracy to be lowered. This phenomenon becomes more conspicuous when an image point locates farther away from the main optical axis lo. Accordingly, sufficient effect can not be attained by the enlarged focus detection area.

SUMMARY OF THE INVENTION

The present invention has been developed with a view to substantially eliminating the above described disadvantage inherent in the prior art focus detecting optical system, and has for its essential object to provide an improved focus detecting optical system employing therein a phase difference detecting method, in which is prevented deterioration in focus detection accuracy caused by a field curvature following an enlarged focus detection area.

In accomplishing this and other objects, according to one preferred embodiment of the present invention, there is provided a focus detecting optical system including an objective lens for forming an image of an object, at least one condenser lens disposed behind a predetermined image plane of the objective lens for converging light passed through the objective lens, at least one pair of image re-forming lenses located behind the condenser lens for re-forming a pair of secondary images of the image formed by the objective lens, at least one pair of rows of light receiving elements arrayed in a single line behind and in alignment with the paired image re-forming lenses for detecting the paired secondary images, and a light deflecting member disposed between the image re-forming lenses and the element rows and separated from the image re-forming lenses by an air space for deflecting light fluxes forming the secondary images outwards in a direction of array of the element rows with respect to a center of the paired secondary images.

By the above described construction, a state of focus adjustment of the objective lens can be detected on the basis of a change of the position of the secondary images detected by the element rows.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and in which:

FIG. 9 is an enlarged cross sectional view of a focus detecting block located at the central portion of the system of FIG. 7.

DETAILED DESCRIPTION OF THE PREFERRED EMBODIMENT

Figure 1:
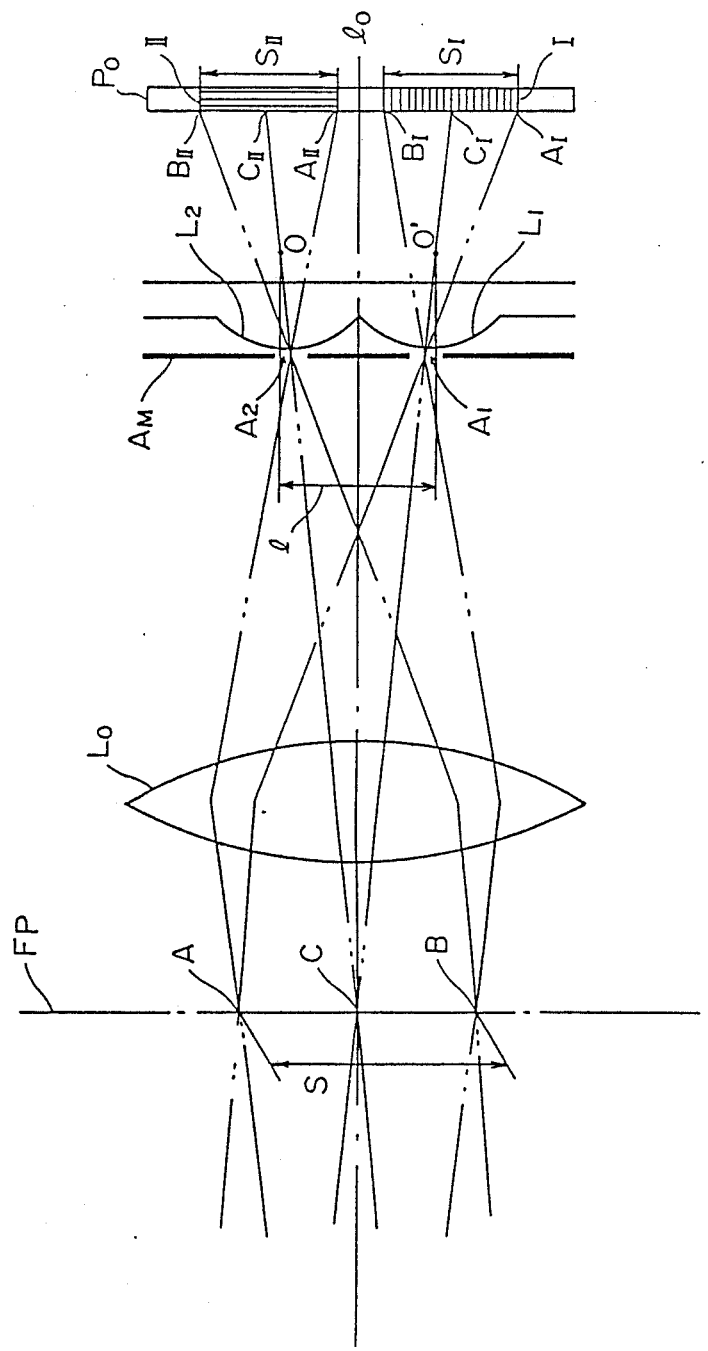
FIG. 1 is a schematic diagram of a conventional focus detecting optical system.
Figure 2:
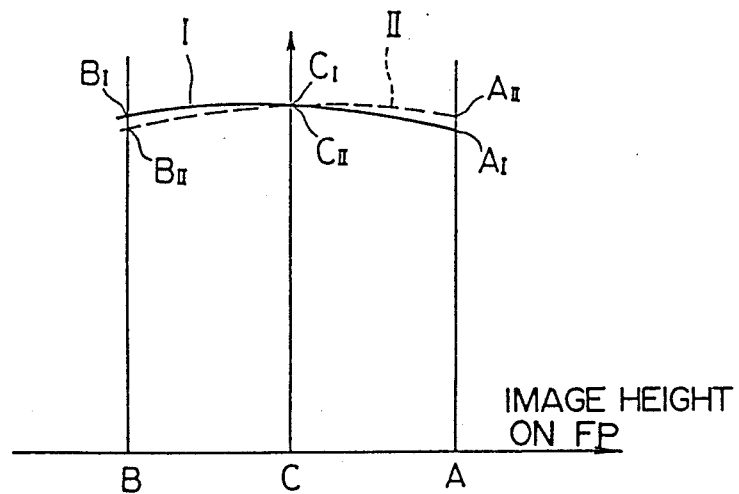
FIG. 2 is a diagram explanatory of the size of point images formed on rows of light receiving elements provided in the system of FIG. 1.
Figure 4:
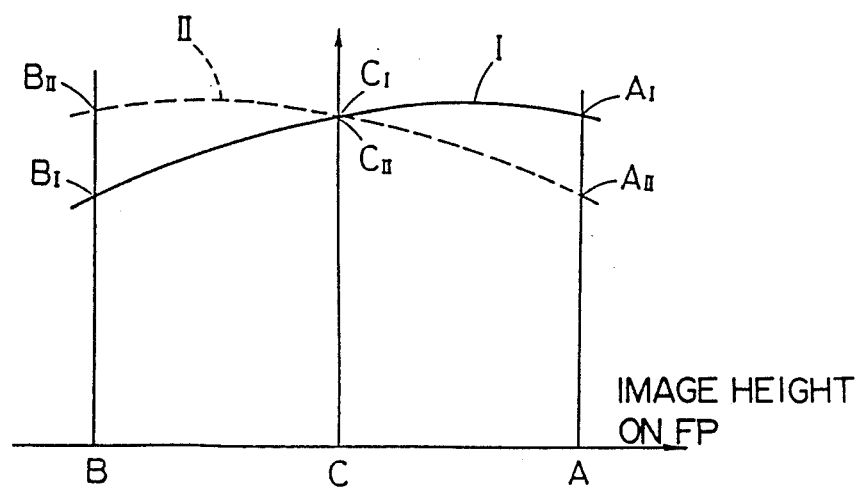
FIG. 4 is a diagram similar to FIG. 2, in the system of FIG. 3.
Figure 3:
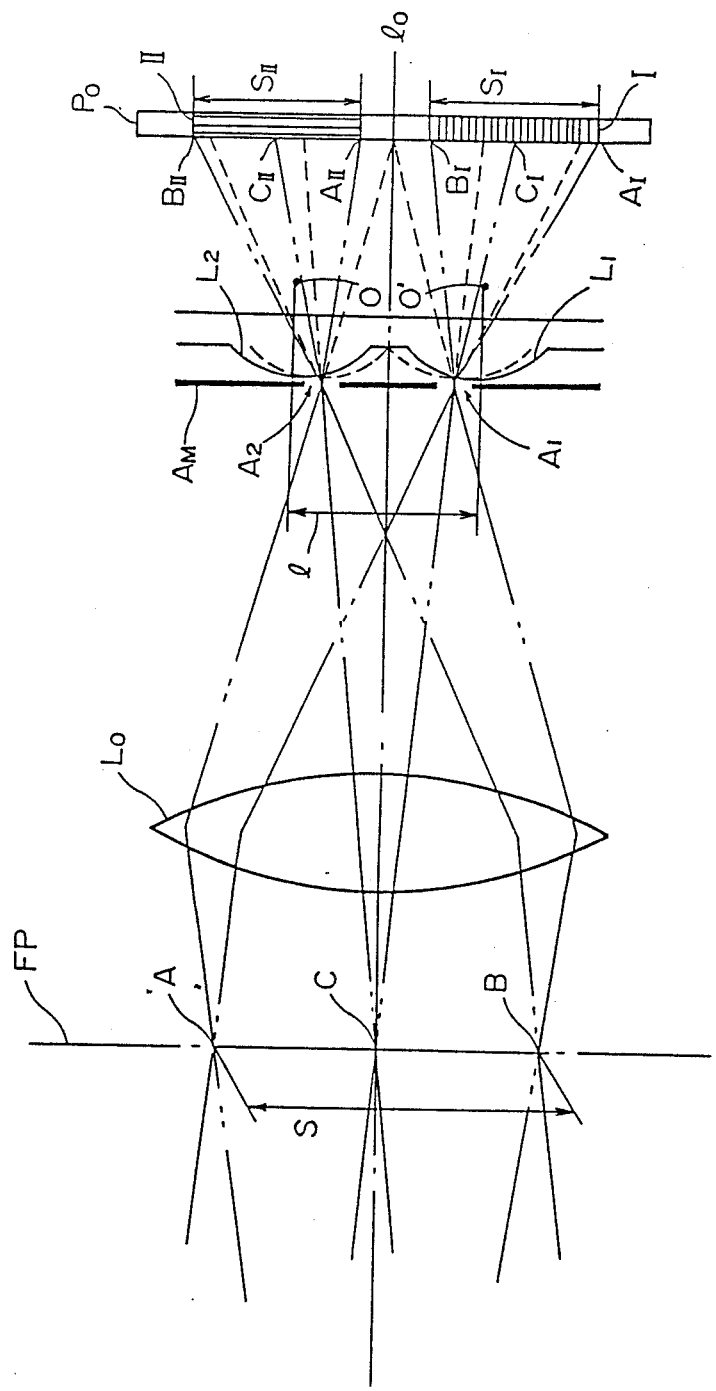
FIG. 3 is a diagram similar to FIG. 1, of another conventional focus detecting optical system.
Figure 5:
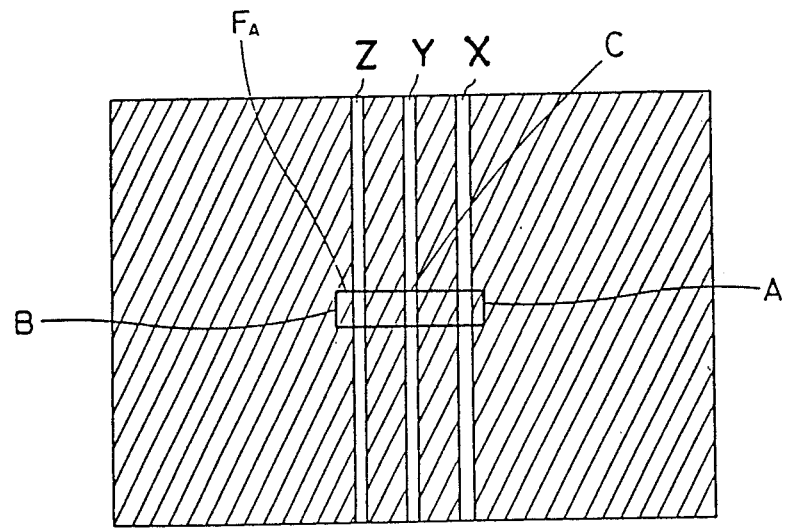
FIG. 5 is a view explanatory of an object, with respect to which the focus detection is executed by the system of FIG. 3.
Figure 6:
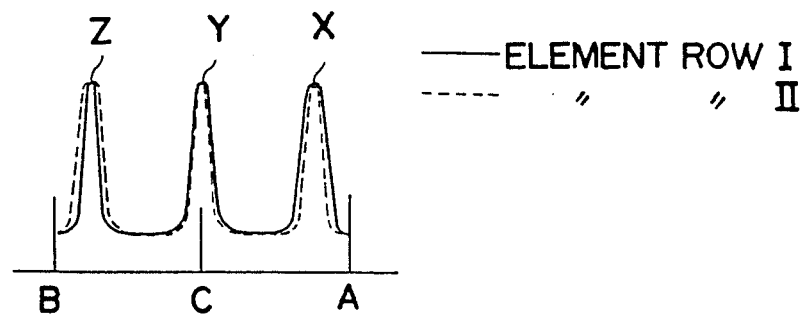
FIG. 6 is a diagram explanatory of light images of the object formed on the element rows in the system of FIG. 3.
Figure 7:
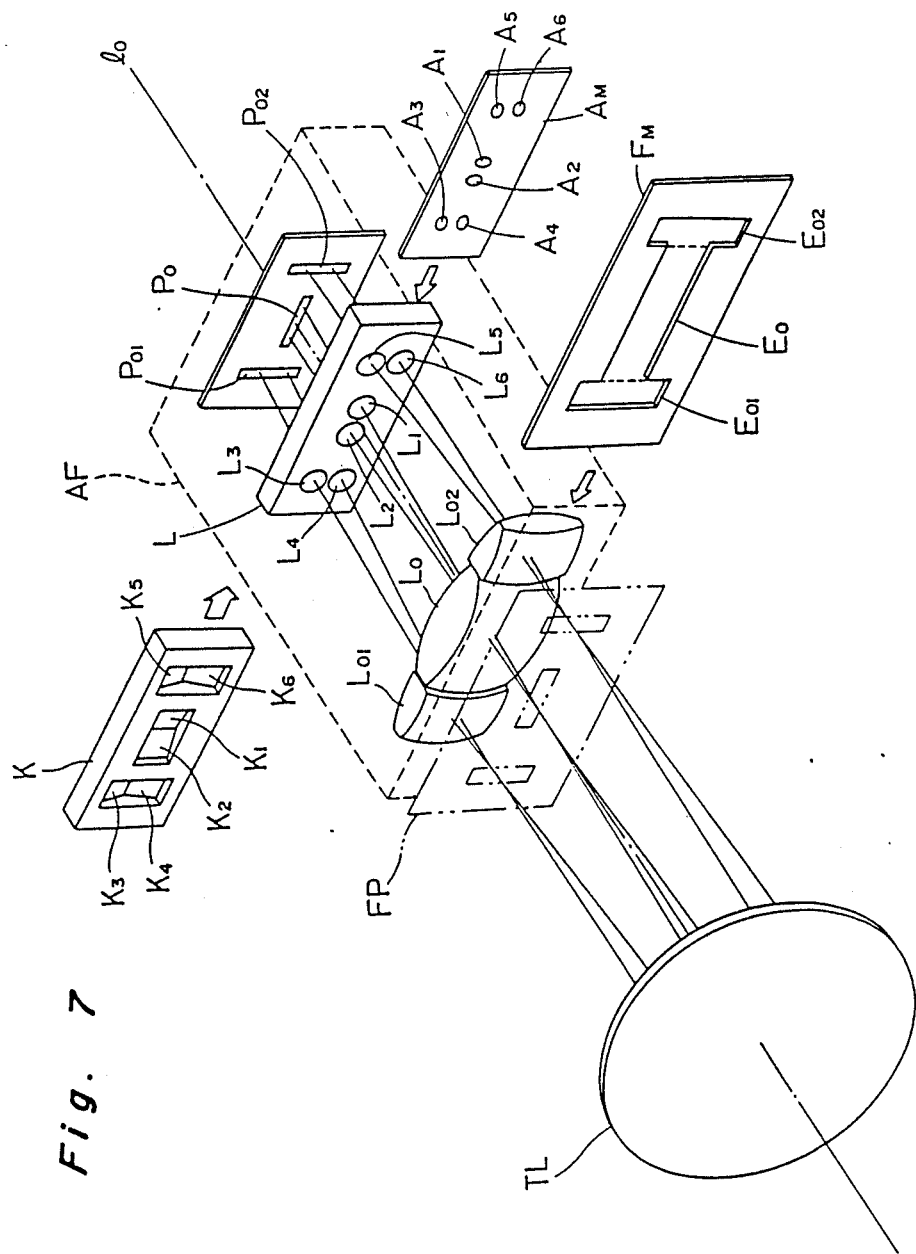
FIG. 7 is a perspective view of a focus detecting optical system according to one preferred embodiment of the present invention.

Referring first to FIG. 7, a focus detecting optical system shown therein comprises an AF (auto-focus) sensor module shown as a phantom block AF. An objective lens TL is shown as positioned in front of the AF sensor module AF with respect to the direction of travel of rays of light towards the AF sensor module AF, particularly CCD (charge-coupled device) line sensors Po, Po1 and Po2.

The AF sensor module AF includes a generally rectangular field mask FM disposed on a predetermined image plane FP of the objective lens TL. The generally rectangular field mask FM defines therein a generally H-shaped opening Eo, Eo1 and Eo2. Light fluxes passing respectively through the openings Eo, Eo1 and Eo2 travel through and are converged by condenser lenses Lo, Lo1 and Lo2, respectively.

Positioned between the condenser lenses Lo, Lo1 and Lo2 and the line sensors Po, Po1 and Po2 is a lens plate L. This lens plate L is of a generally rectangular shape and defines therein a pair of image re-forming lenses L1 and L2, positioned in side-by-side fashion in alignment with the longitudinal axis of the lens plate L, and pairs of image re-forming lenses L3 and L4, L5 and L6 defined on respective sides of the paired image re-forming lenses L1 and L2, the image re-forming lenses L3 and L4 or L5 and L6 of each pair being positioned one above the other in a direction perpendicular to the longitudinal axis of the lens plate L. Each of the image re-forming lenses L1 to L6 formed on the lens plate L is a plano-convex lens having the same radius of curvature and, therefore, one of the opposite surfaces of the lens plate L is flat while the other of the same is formed with projections equal in number to and aligned in position with the respective image re-forming lenses L1 to L6.

It is to be noted that in this embodiment, although all the image re-forming lenses L1 to L6 are integrally formed with the lens plate L, three pairs of image re-forming lenses L1 and L2, L3 and L4, L5 and L6 may be separated from one another.

A generally rectangular aperture mask AM having three sets of paired oval apertures A1 and A2, A3 and A4, A5 and A6 is positioned frontwards of and spaced a certain distance from the lens surface of the lens plate L, with the paired oval apertures A1 and A2, A3 and A4, A5 and A6 aligned with the paired image re-forming lenses L1 and L2, L3 and L4, L5 and L6, respectively.

Behind the lens plate L is positioned a light deflecting member K of a generally rectangular shape. One surface of the light deflecting member K confronts the lens plate L and defines therein a horizontally extending concave at its central portion and a pair of vertically extending concaves on respective sides of the horizontally extending one. Accordingly, the light deflecting member K is separated at its concaves from said lens plate L by air spaces. The other surface of the light deflecting member K confronts the CCD line sensors Po, Po1 and Po2 and is formed flat. The concave formed at the central portion of the light deflecting member is defined by a pair of horizontally symmetrically inclined planes K1 and K2 whereas the other two concaves are defined by pairs of vertically symmetrically inclined planes K3 and K4, K5 and K6, respectively. These three concaves are of the same wedge-shaped configuration and may be formed in separated three light deflecting members, respectively.

The CCD line sensors Po, Po1 and Po2 are all mounted on a generally rectangular substrate with the line sensor Po positioned between the line sensors Po1 and Po2 and also with the line sensor Po extending horizontally and perpendicular to any one of the line sensors Po1 and Po2. The carrier substrate for the CCD line sensors Po, Po1 and Po2 is so positioned behind the light deflecting member K that not only can the line sensors Po, Po1 and Po2 be aligned with the paired image re-forming lenses L1 and L2, L3 and L4, L5 and L6 and with the paired inclined planes K1 and K2, K3 and K4, K5 and K6, respectively, but also the longitudinal axis of each of the line sensors Po, Po1 and Po2 can assume a parallel relationship with the direction in which the associated paired image re-forming lenses L1 and L2, L3 and L4, L5 and L6 adjoin with each other. With the CCD line sensors Po, Po1 and Po2 so supported and so positioned as hereinbefore described, each of the CCD line sensors Po, Po1 and Po2 is comprised of first and second rows of a plurality of light receiving elements, the first and second element rows being substantially continued in end-to-end fashion with each other so that images formed by the paired image re-forming lenses L1 and L2, L3 and L4, 15 and L6, respectively, can be projected onto the first and second element rows of the associated CCD line sensor Po, Po1 or Po2.

Figure 8A:
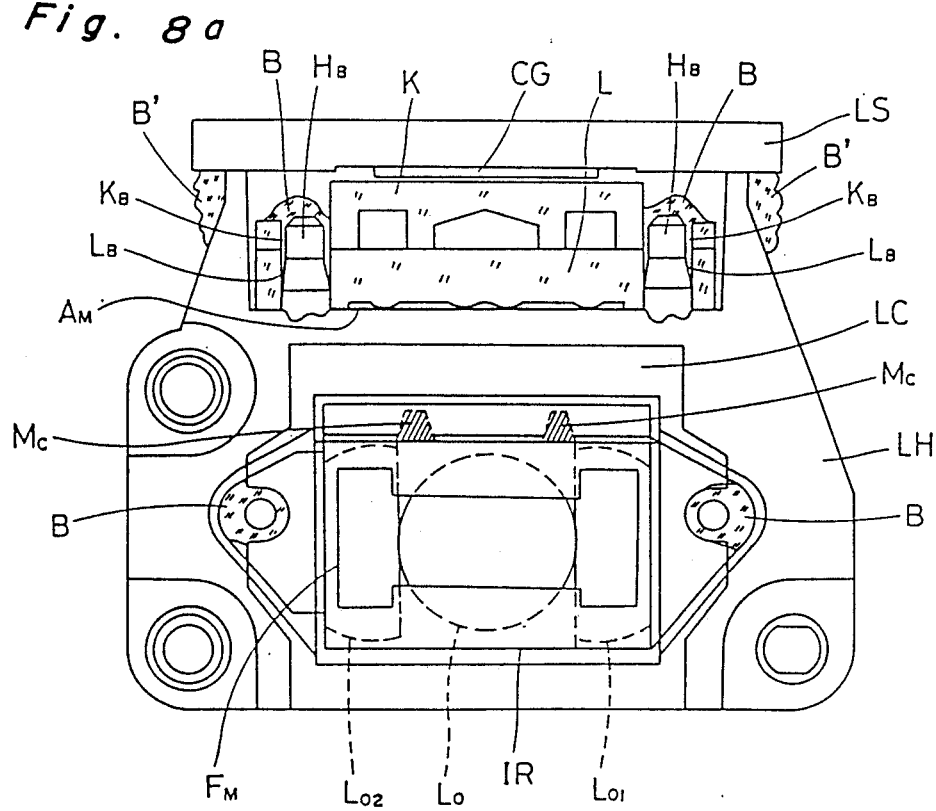
FIGS. 8a and 8b are a top plan view and a side sectional view, respectively, of an AF sensor module provided in the system of FIG. 7 at the time when the AF sensor module is incorporated therein.
Figure 8B:
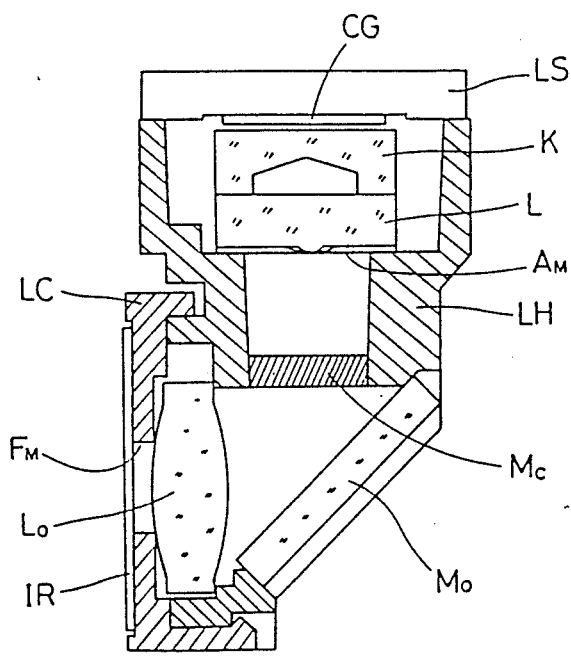

FIGS. 8a and 8b depict a state at the time when the AF sensor module AF has been incorporated in the focus detecting optical system. As shown in FIG. 8b, the AF sensor module AF is internally provided with a module mirror Mo for changing the direction of a light path approximately by 90 degrees so that the entire AF sensor module AF may be formed into a compact size. The condenser lenses Lo, Lo1 and Lo2 are securely held by a lens holder LH to which a lens cover LC also serving as the field mask FM is attached. An infrared rays cut filter IR is covered on a front surface of the lens cover LC. Inside the lens holder LH is disposed a stray light cut mask MC for optically separating between an axial focus detecting block (i.e. L1, L2, K1, K2 and Po) and off-axial focus detecting blocks (i.e. L3–L6, K3–K6, Po1 and Po2). The light deflecting member K is in close contact and in alignment with the lens plate L except at its concaves K1–K6 for proper positioning thereof and is securely bonded to the lens holder LH by virtue of any known bonding material B. The lens holder LH has a pair of bosses HB for engagement with pairs of openings LB and KB formed in the lens plate L and the light deflecting member K, respectively. The positioning of the lens plate L and the light deflecting member K is performed upon engagement between the paired bosses HB and the paired openings LB and KB, and the bonding material B is then poured into the space outside the bosses HB. A CCD line sensor unit LS provided with the line sensors Po, Po1 and Po2 is securely bonded on the lens holder LH by the bonding material B' so that its light receiving surface having thereon a cover glass CG may be opposed to the light deflecting member K.

The AF sensor module AF of the above described structure is accommodated, for example, in a lower portion of a mirror box of a single lens reflex camera. In this kind of camera, a light flux having passed through a half-mirror portion of a main mirror is introduced into the lower portion of the mirror box by means of an auxiliary mirror located behind the main mirror.

FIG. 9 is an enlarged cross sectional view of the focus detecting block located at the central portion of the focus detection optical system of FIG. 7.

As shown in FIG. 9, with this embodiment, for the purpose of deflecting light fluxes, the image re-forming lenses L1 and L2 are off-centered outwardly with respect to light fluxes entering the central points of the paired apertures A1 and A2 of the aperture mask AM from the central point C of the focus detection area as well as there is provided the light deflecting member K. Assuming that the light deflection is performed only by a disposition of the image re-forming lenses without the light deflecting member K, a light flux passing through the aperture A2 and the image re-forming lens L2 from the end point A of the focus detection area forms an image earlier than another light flux passing through the aperture A2 and the image re-forming lens L2 from the end point B of the focus detection area does, as shown by dotted lines in FIG. 9. In such a state, when the light deflecting member K is inserted between the lens plate L and the line sensor unit LS, the light flux having passed through the aperture A2 and the image re-forming lens L2 from the end point A of the focus detection area is deflected by the inclined plane K2 and then travels substantially straightforwards to enter an end point $A_{II}$ of the the second element row II, whereas the light flux having passed through the aperture A2 and the image re-forming lens L2 from the end point B of the focus detection area is deflected by the inclined plane K2 and is then further deflected at a rear surface of the light deflecting member K in a direction opposite to the main optical axis :o to enter another end point $B_{II}$ of the second element row II. That is to say, as a light receiving location on the rear surface of the light deflecting member K approaches the end point $B_{II}$ from the end point $A_{II}$, the angle of deflection becomes larger. As a result, the light flux entering the end point $B_{II}$ of the second element row II travels farther than that entering the end point $A_{II}$ of the same element row II does. This fact makes it possible to modify the field curvature caused by the off-centered image re-forming lens L2. The same is true for the image re-forming lens L1. Thus, the light deflecting member K acts not only for deflecting light fluxes but also for correcting aberration. In view of the above, the point images viewed by the first and second element rows I and II through the same aperture can be rendered substantially identical in size with each other by properly determining the amount of eccentricity of the image re-forming lenses L1 and L2, the thickness of the light deflecting member K, the inclination of the inclined planes K1 and K2, and the distance between the light deflecting member K and the two element rows I and II. Accordingly, it is possible to avoid the deterioration of the focus detection accuracy and to optionally determine the position of incident light, thus facilitating the enlargement of the focus detection area.

It is to be noted that although the focus detecting optical system according to this embodiment is provided with a plurality of focus detecting blocks, the present invention is also applicable to a focus detecting optical system provided with a single focus detecting block.

It is further to be noted that in a plurality of focus detecting blocks, the structure of the present invention may be employed in some of them each requiring a wide focus detection area, with the conventional structure being employed in the other blocks.

As described above, in the focus detecting device employing therein the phase difference detecting method, the light deflecting member, which deflects light fluxes forming the first and second images outwards in a direction of array of the rows of the light receiving elements with respect to the optical axis of the objective lens, is placed between the image re-forming lenses and the element rows. This light deflecting member is serviceable for the enlargement of the focus detection area and can modify the curvature of the image plane following the same. Because of this, the light deflecting member can effectively prevent the deterioration of the focus detection accuracy. Particularly, even when edge portions of the focus detection area are partly in contrast with other portions, the focus detection can be correctly executed without being affected by the curvature of the image plane. High accuracy in focus detection can be effectively obtained throughout the wide focus detection area.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A focus detecting optical system comprising:
an objective lens for forming an image of an object;
at least one condenser lens, disposed behind a predetermined image plane of said objective lens, for converging light passed through said objective lens;
at least one pair of image re-forming lenses, located behind said condenser lens, for re-forming a pair of secondary images of the image formed by said objective lens;
at least one pair of rows of light receiving elements, arrayed in a single line behind and in alignment with said paired image re-forming lenses, for detecting said paired secondary images; and
a light deflecting member, disposed between said image re-forming lenses and said element rows and separated from said image re-forming lenses by an air space, for deflecting light fluxes forming said secondary images outwards in a direction of array of said element rows with respect to a center of said paired secondary images,
said condenser lens, said paired image re-forming lenses, said paired element rows and said light deflecting member constituting one focus detecting assembly for detecting a state of focus adjustment of said objective lens on the basis of a change of the position of said secondary images detected by said element rows.

2. The focus detecting optical system according to claim 1, wherein said light deflecting member is properly positioned and securely held by a holding member for properly positioning and securely holding said image re-forming lenses.

3. The focus detecting optical system according to claim 1, wherein said light deflecting member has one surface confronting said image re-forming lenses and defining a wedge-shaped concave having two inclined planes symmetrically inclined in a direction of array of said element rows, and the other flat surface confronting said element rows.

4. The focus detecting optical system according to claim 3, wherein said light deflecting member is properly positioned and securely held by a holding member for properly positioning and securely holding said image re-forming lenses.

5. The focus detecting optical system according to claim 1, comprising plural sets of said focus detecting assemblies in which the optical members having the same function are integrally formed with each other.

6. The focus detecting optical system according to claim 5, wherein said light deflecting member is properly positioned and securely held by a holding member for properly positioning and securely holding said image re-forming lenses.

7. The focus detecting optical system according to claim 5, wherein said integrally formed optical members are the image re-forming lenses.

8. The focus detecting optical system according to claim 7, wherein said light deflecting member is properly positioned and securely held by a holding member for properly positioning and securely holding said image re-forming lenses.

9. The focus detecting optical system according to claim 5, wherein said integrally formed optical members are the light deflecting members.

10. The focus detecting optical system according to claim 9, wherein said light deflecting member is properly positioned and securely held by a holding member for properly positioning and securely holding said image re-forming lenses.

11. The focus detecting optical system according to claim 9, wherein each of said light deflecting members has one surface confronting said corresponding image re-forming lenses and defining a wedge-shaped concave having two inclined planes symmetrically inclined in a direction of array of said corresponding element rows, and the other flat surface confronting said corresponding element rows, a plurality of said wedge-shaped concaves being identical in configuration with one another.

12. The focus detecting optical system according to claim 11, wherein said light deflecting member is properly positioned and securely held by a holding member for properly positioning and securely holding said image re-forming lenses.

13. The focus detecting optical system according to claim 5, wherein each of said light deflecting members has one surface confronting said corresponding image re-forming lenses and defining a wedge-shaped concave having two inclined planes symmetrically inclined in a direction of array of said corresponding element rows, and the other flat surface confronting said corresponding element rows, a plurality of said wedge-shaped concaves being identical in configuration with one another.

14. The focus detecting optical system according to claim 13, wherein said light deflecting member is properly positioned and securely held by a holding member for properly positioning and securely holding said image re-forming lenses.

15. The focus detecting optical system according to claim 1, further comprising an aperture mask positioned between said condenser lens and said image re-forming lenses and having at least one pair of apertures corresponding to said image re-forming lenses, wherein said image re-forming lenses are positioned so that the lenses are shifted in a direction to extend the distance between the lenses with respect to the distance of the apertures.

* * * * *